Patented Jan. 20, 1931

1,789,879

UNITED STATES PATENT OFFICE

ARTHUR J. PAIGE, OF DETROIT, MICHIGAN

TORQUE CONVERTER

Application filed April 30, 1929. Serial No. 359,281.

The present invention relates to devices for transmitting power from a prime mover to a load shaft and increasing the torque during such transmission.

Among the objects of the invention is a device which may be substituted for the several forms of so-called "transmission" units now in use on automotive vehicles and thereby do away with the necessity of "shifting gears" and the attendant annoyances. Another object is a device of the kind indicated which shall be more efficient in operation than, and not subject to the losses common to other devices of the same general character.

Another object is a device of the type indicated in which the reactive forces of the gear reduction shall be balanced out and therefore do not interfere with the efficiency of the device.

Still another object is the utilization of the balancing means just referred to for mechanically balancing the device.

Other objects will readily occur to those skilled in the art upon reference to the following description and the accompanying drawings in which Fig. 1 is a longitudinal section through the preferred form of the embodiment of the invention.

Figure 1:
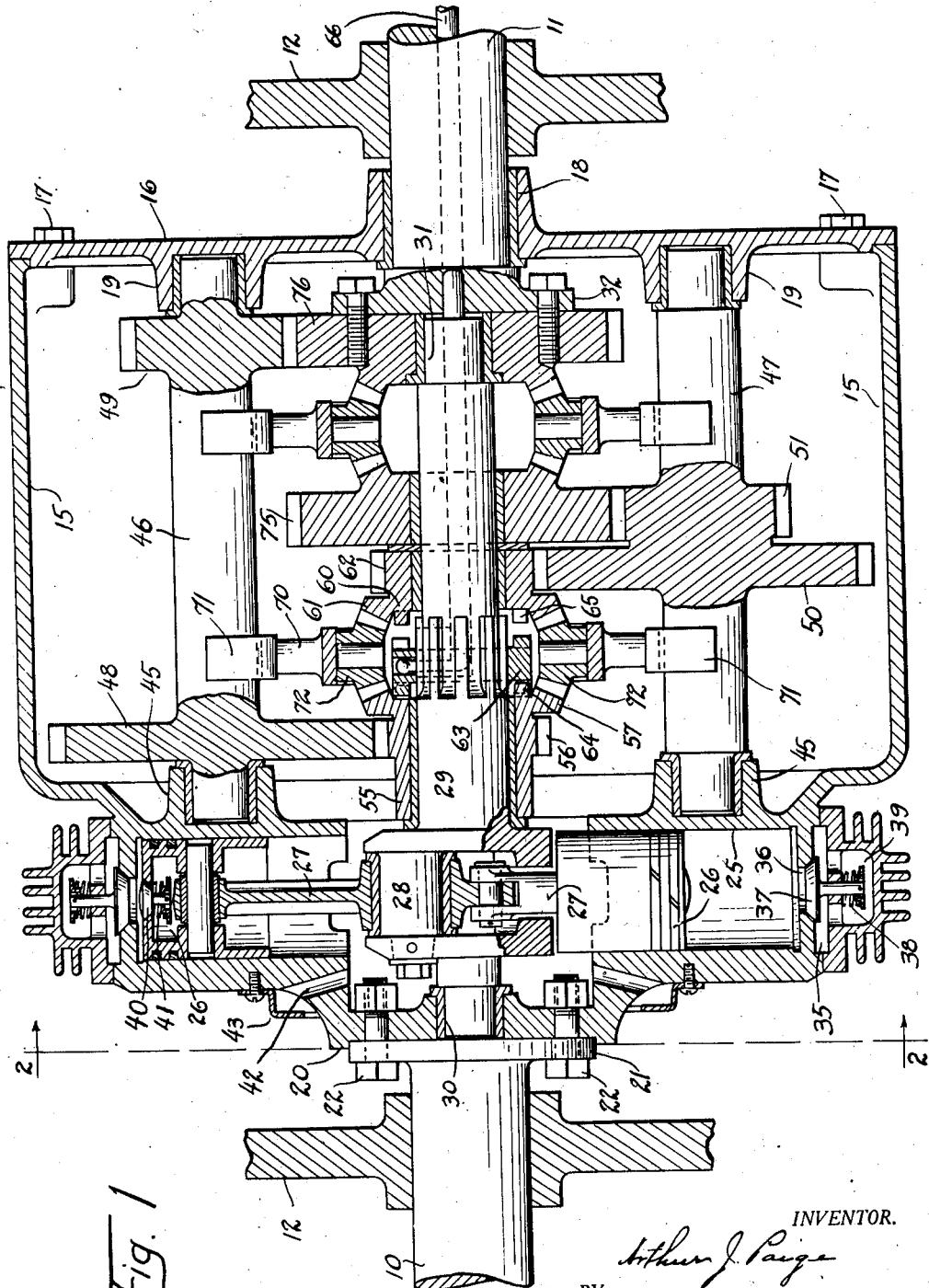
Figure 2:
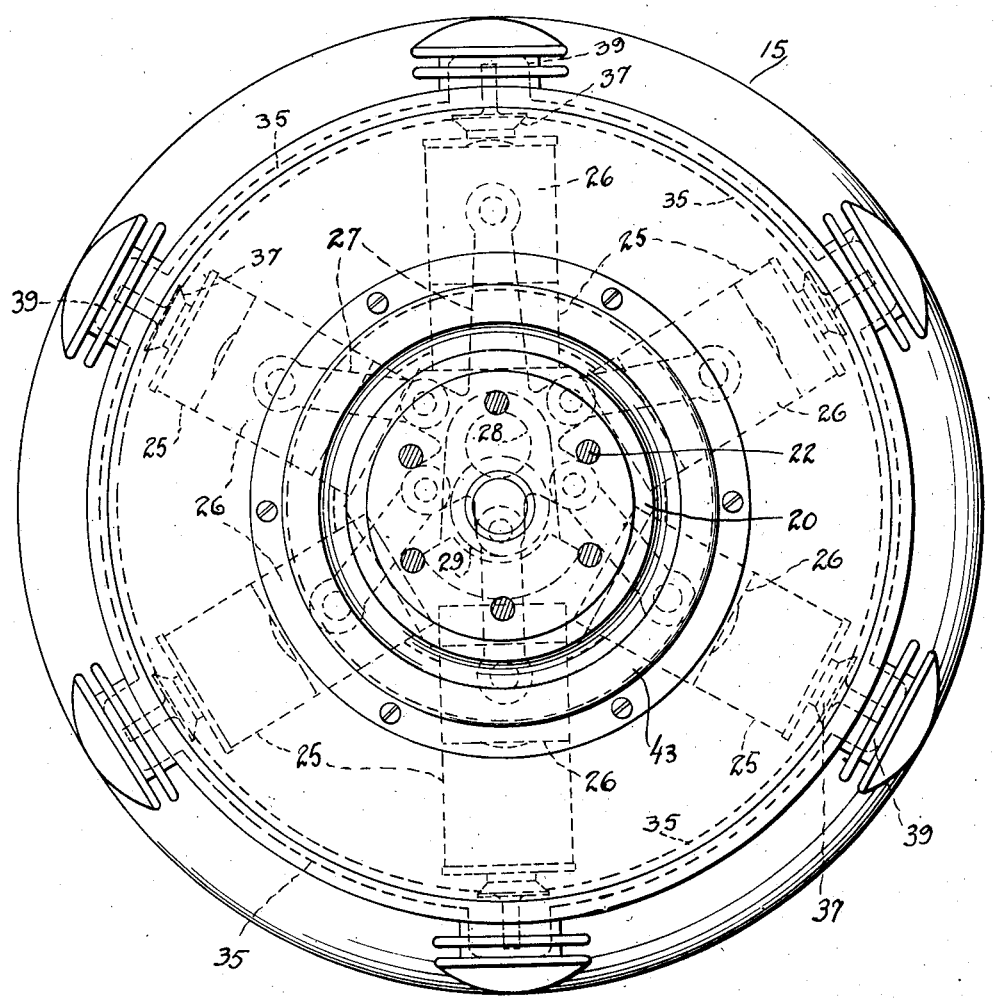
Fig. 2 is a front elevation of the device with the drive shaft and flange removed.
Figure 3:
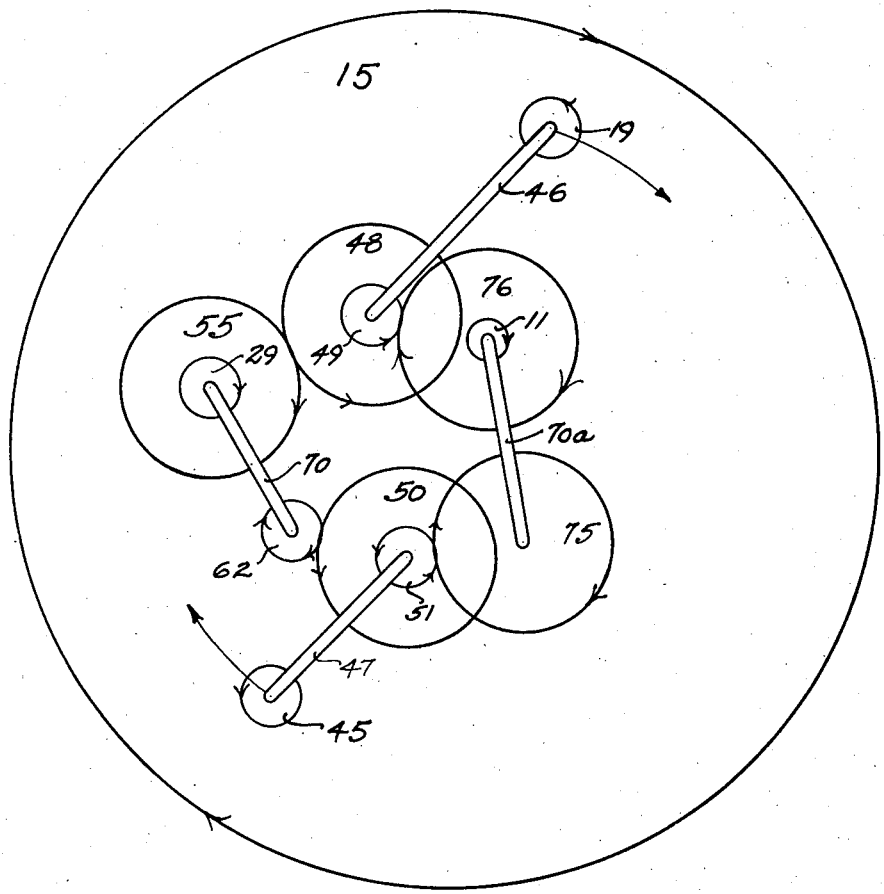
Fig. 3 is a diagrammatical view of the gear box of the device.

In the drawings the device is shown as comprising a casing preferably generally cylindrical and at one end bolted to the flange of a shaft which is the drive shaft while at the other end it is provided with a bearing upon another shaft in axial alignment with the first and which is the driven shaft. The device may be supported on these two shafts and may be enclosed in a suitable cage or housing not shown. In the form of the device shown, the enclosing means will preferably be a cage as it is desirable to have at least a part of the device so arranged that it may be surrounded by air for conducting away any heat which may be generated.

The drive shaft is indicated at 10 with the driven shaft at 11 and the supporting means for the device indicated conventionally at 12 as a suitable frame or frame members. It will be understood, of course, that suitable bearings will be provided in the members 12 for the two shafts.

The cylindrical casing mentioned is indicated at 15 and is closed at one end by a suitable plate 16 secured to the casing as by cap screws 17. This plate 16 will have at its center the bearing 18 for shaft 11 and on its inner surface provided with bearing cups 19 for receiving the ends of the gear carrying shafts to be described later.

Surrounding the outer ends of the cylinders which will, of course be arranged radially, is a small annular chamber 35 connected to the several cylinders through openings 36 controlled by the valves 37, these valves being spring pressed inwardly as by the springs 38 and small domes 39 may be arranged opposite each cylinder in order to provide the necessary space for the valve stem and spring 38. Each of the pistons 26 will also be provided with a valve 40 in its head opening outwardly of the piston and provided with a spring 41 tending to hold it on its seat.

It should be noted that while automatic valves have been described positive operation of the valves may be provided if desired.

In this arrangement of cylinders, pistons and valves, each cylinder and piston constitutes a pump which will draw air from within the casing and force it into the chamber 35 through the several valves. This air may be admitted to the casing through openings 42 which may be covered with a suitable shield 43.

This arrangement of pumps and the compression chamber 35 provides what may be termed "progressive clutch" and while this form of such a clutch is preferred other types of "progressive clutch" may be used without departing from the spirit of the invention.

Inwardly of the cylinders 25 the device is provided with the two cup bearings 45 placed opposite the cup bearings 19 in the plate 16 and one pair of cup bearings carries a shaft 46 while the other pair carries the shaft 47. Shaft 46 is provided with a gear near each end, one of which will be a large gear 48 while the other will be a smaller gear 49. The shaft 47 likewise carries two gears but both will be arranged near the center of the shaft while one 50 will be the same size as gear 48 and the other gear 51 will be the same size as the gear 49.

Mounted on the shaft 29 and rotatable thereon is a sleeve 55 having formed intermediate its ends with a small gear 56 aligned and adapted to mesh with the gear 48 while at the inner end of this sleeve is provided with a bevel ring gear 57.

Also mounted on the shaft 29 is a second sleeve 60 which has formed thereon the beveled ring gear 61 similar in form to but placed opposite to bevel ring gear 57, the sleeve 60 also carrying a small gear 62 and located so as to mesh with the gear 50 on shaft 47. Between the two gears 57 and 61, the shaft 29 is splined and carries a toothed collar 63 which may be moved to mesh with teeth 64 formed on the end of sleeve 55, or with teeth 65 formed on the adjacent end of sleeve 60 so that by moving the collar 63 to engage with one end or the other of these two sleeves, either of the two gears 57 and 61 may be fixed to the shaft 29 as is desired.

This collar is shown as being operated through a rod 66 located within a suitable axial opening in shafts 29 and 11 and extending to some suitable operating means.

The two gears 57 and 61 are the ring gears of a differential, the spider 70 of which is provided with yokes 71 which embrace the shafts 46 and 47 or which may be connected to the casing 15 so as to cause the rotation of the spider when the casing is rotated and carries it around with these two shafts. The spider 70 is also provided with a plurality of small beveled gears 72 meshing with the two ring gears 57 and 61 so that the several meshing beveled gears 72 constitute a well-known type of differential gearing.

The form of differential just described is preferred but spur gear differentials may be used if desired.

The differential mechanism just described occupies about one-half of the length of the shaft 29 while the rest of the length of this shaft is occupied by a differential mechanism including a spider 70a which is exactly similar with the exception that instead of the small spur gears 56 and 62 larger spur gears 75 and 76 are used, and also with the exception that no dog clutch is included. The gears 75 and 76 are of the same size as gears 48 and 50 while the gears 56 and 62 are of the same size as the gears 49 and 51. Further, the gear 76 will be bolted or otherwise fixed to the flange 32 of the driven shaft 11.

It will be noted that the several elements in the casing 15, on the same side of the center line as shaft 46 and cooperating therewith are duplicated on the opposite side of the center line to cooperate with shaft 47 so that the device is in mechanical balance. However, this mechanical balance is not the main reason for arranging the elements as they are.

When the shaft 10 is driven and a resistance is applied to shaft 11, assuming the dog clutch to be in the position shown in the drawing, the casing 15 and attached parts will turn with the shaft 10. However, if the shaft 11 is held against turning, the several gears will necessarily rotate and cause the rotation of shaft 29 at a higher speed than the speed of the casing.

When the shaft 29 rotates relative to casing 15, this will, of course, cause the operation of the pistons 26 in their cylinders and they will begin to pump air into the chamber 35. After a short time, due to the compression of the air in this chamber, the pistons will begin to receive more and more resistance until the pistons will finally come to rest with respect to the cylinders and the shaft 29 be rotated at the same speed as the casing. When the pistons have come substantially or actually to rest, of course, the drive will be direct as the device will then rotate as a unit.

Assuming a resistance on the shaft 11, when the shaft 10 begins to rotate, through the action of the pumps made up of the pistons 26 and cylinders 25, the air pressure in chamber 35 builds up until the resistance to piston movement turns the shaft 29 through the crank 28. This rotation of the shaft 29 through the train of gears 56, 48, 49, and 76 tends to rotate the shaft 11 at a reduced speed, the particular gearing illustrated receiving about four to one reduction.

Placed as they are in this position, they will of course rotate in the same direction as the rotation of the shaft 29. If the dog clutch 63 is moved over to coact with the sleeve 65, the drive will then be through the gear trains 50, 51 and 75 and the latter gear through the differential gearing will rotate the gear 76 in the opposite direction of the shaft 29.

It will be noted that the gears 50 and 51 rotate in the reverse direction from gears 48 and 49, this being accomplished through the use of the two differentials. Therefore, any reactive forces impressed on the casing 15 through the operation of shaft 46 and its gears will be balanced out by corresponding forces in the opposite direction through the action of the shaft 47 and its gears.

Now having described the invention and the preferred form of embodiment thereof, it is to be understood that the said invention is to be limited, not to the specific details herein described and illustrated, but only by the scope of the claims which follow:—

I claim:—

1. In a torque converter a casing, a driving means connected to said casing and rotating the same, a shaft to be driven extending into said casing, an intermediate shaft within said casing and in alignment with the driven shaft, means for fixing said intermediate shaft to said casing as the resistance on said driven shaft tends to retard the rotation thereof, a gear carried by said intermediate shaft, a gear carried by said driven shaft, a connecting gear series for said other two gears arranged in said casing to one side of the axis of said shafts, a second gear series mounted in said casing in a position diametrically opposite said first series and spaced from the said axis an equal distance, said gear series comprising equal numbers of gears of equal size, a pair of differential mechanisms mounted in said casing concentric with said axis and having their cages rotatable with the casing, the ring gear of said differential furthest from each other being fixed to said intermediate shaft and to said driving shaft respectively, the adjacent ring gears of said differentials meshing with the gears of said second series whereby when said casing is rotated the gears of one series rotate relatively to the casing in one direction while the gears of said second series rotate relatively to said casing in the opposite direction.

2. In a torque converter, a rotatable carrier, driving means therefor, a driven means, a shaft adjacent said carrier and intermediate said two means, a gear train operatively connecting said intermediate shaft, said carrier, and said driven means, and a second gear train rotatable in an opposite direction to the first train, and also operatively connecting said intermediate shaft, said carrier, and said driven means, said gear trains being operatively connected to each other thru said intermediate shaft, said carrier, and said driven means, whereby the reaction of one train on said carrier is absorbed or counterbalanced by the reaction of the other train on said carrier.

3. In a torque converter, a rotatable carrier, driving means therefor, a driven means, a shaft adjacent said carrier and intermediate said two means, means for progressively clutching said shaft to said carrier, a gear train operatively connecting said intermediate shaft, said carrier and said driven means, and a second gear train rotatable in an opposite direction to the first train, and also operatively connecting said intermediate shaft, said carrier, and said driven means, said gear trains being operatively connected to each other thru said intermediate shaft, said carrier, and said driven means, whereby the reaction of one train on said carrier is absorbed or counterbalanced by the reaction of the other train on said carrier.

4. In a torque converter, a rotatable carrier, driving means therefor, a driven means, a shaft adjacent said carrier and intermediate said two means, automatic means for progressively clutching said shaft to said carrier, a gear train operatively connecting said intermediate shaft, said carrier and said driven means, and a second gear train rotatable in an opposite direction to the first train, and also operatively connecting said intermediate shaft, said carrier, and said driven means, said gear trains being operatively connected to each other thru said intermediate shaft, said carrier, and said driven means, whereby the reaction of one train on said carrier is absorbed or counterbalanced by the reaction of the other train on said carrier.

5. In a torque converter, a rotatable casing, means to drive said casing, a driven shaft extending into said casing, gear trains in said casing for creating driving connection between the latter and said shaft, said gear trains being interconnected and oppositely disposed in said casing so that the reaction of one of them on said casing is absorbed or counterbalanced by the reaction of the other train on said casing.

6. In a torque converter, a rotatable casing, means to drive said casing, a driven shaft extending into said casing, gear trains in said casing for creating driving connections between the latter and said shaft, said gear trains being interconnected and oppositely disposed in said casing so that the reaction of one of them on said casing is absorbed or counterbalanced by the reaction of the other train on said casing, and means for progressively clutching said casing to said gear trains.

7. In a torque converter, a rotatable casing, means to drive said casing, a driven shaft extending into said casing, gear trains in said casing for creating driving connections between the latter and said shaft, said gear trains being interconnected and oppositely disposed in said casing so that the reaction of one of them on said casing is absorbed or counterbalanced by the reaction of the other train on said casing, and automatic means for progressively clutching said casing to said gear trains.

8. In a torque converter, driving means, driven means, and a shaft intermediate said two means, a pair of carrier elements axially traversed by and rotatable on the axis of said intermediate shaft, a pair of reaction shafts connecting said carrier elements and mounted on both of them so as to independently rotate thereon and to rotate therewith as they rotate on the axis of said intermediate shaft, a gear train connecting said intermediate shaft, one of said reaction shafts, and said driven means, and a second gear train connected to said first train and connecting said intermediate shaft, the other of said reaction shafts and said driven means, and adapted to counterbalance the reaction of the first gear train.

9. In a torque converter, driving means, driven means, and a shaft intermediate said two means, a pair of carrier elements axially traversed by and rotatable on the axis of said intermediate shaft, a pair of reaction shafts connecting said carrier elements and mounted on both of them so as to independently rotate thereon and to rotate therewith as they rotate on the axis of said intermediate shaft, a gear train connecting said intermediate shaft, one of said recation shafts, and said driven means, and a second gear train connected to said first train and connecting said intermediate shaft, the other of said reaction shafts and said driven means, and adapted to counterbalance the reaction of the first gear train, said gear trains being so connected to said reaction shafts as to cause each of the latter to rotate axially in the same direction.

10. In a torque converter, driving means, driven means, and a shaft intermediate said two means, a pair of carrier elements axially traversed by and rotatable on the axis of said intermediate shaft, a pair of reaction shafts connecting said carrier elements and mounted on both of them so as to independently rotate thereon and to rotate therewith as they rotate on the axis of said intermediate shaft a gear train connecting said intermediate shaft, one of said reaction shafts, and said driven means, and a second gear train connected to said first train and connecting said intermediate shaft, the other of said reaction shafts and said driven means, and adapted to counterbalance the reaction of the first gear train, said gear trains being so connected to said reaction shafts as to cause each of the latter to rotate axially in a direction opposite to the direction of rotation of said carrier elements.

11. In a torque converter, driving means, driven means, and a shaft intermediate said two means, a pair of carrier elements axially traversed by and rotatable on the axis of said intermediate shaft, a pair of reaction shafts connecting said carrier elements and mounted on both of them so as to independently rotate thereon and to rotate therewith as they rotate on the axis of said intermediate shaft, a gear train connecting said intermediate shaft, one of said reaction shafts, and said driven means, and a second gear train connected to said first train and connecting said intermediate shaft, the other of said reaction shafts and said driven means, and adapted to counterbalance the reaction of the first gear train, said gear trains being so connected to said reaction shafts as to cause each of the latter to rotate axially in a direction opposite to the direction in which they rotate with said carrier elements.

12. In a torque converter, driving means, driven means, and a shaft intermediate said two means, a casing having a pair of carrier elements axially traversed by and rotatable on the axis of said intermediate shaft, a pair of reaction shafts connecting said carrier elements and mounted on both of them so as to independently rotate thereon and to rotate therewith as they rotate on the axis of said intermediate shaft, a gear train connecting said intermediate shaft, one of said reaction shafts, and said driven means, and a second gear train connected to said first train and connecting said intermediate shaft, the other of said reaction shafts and said driven means, and adapted to counterbalance the reaction of the first gear train.

13. In a torque converter, driving means, driven means, and a shaft intermediate said two means, a pair of carrier elements axially traversed by and rotatable on the axis of said intermediate shaft, a pair of reaction shafts connecting said carrier elements and mounted on both of them so as to independently rotate thereon and to rotate therewith as they rotate on the axis of said intermediate shaft, a gear train connecting said intermediate shaft, one of said reaction shafts, and said driven means, and a second gear train connected to said first train and connecting said intermediate shaft, the other of said reaction shafts and said driven means, and adapted to counterbalance the reaction of the first gear train, the connection between a gear train and a reaction shaft including a yoke like element surrounding said reaction shaft and rigidly secured to one of the gears in said train.

Signed at the city of Detroit, county of Wayne, and State of Michigan, this 24th day of April, 1929.

ARTHUR J. PAIGE.